(12) United States Patent
Sato (10) Patent No.: US 6,900,963 B1
(45) Date of Patent: May 31, 2005

(54) THIN FILM MAGNETIC HEAD WITH TRACK WIDTH RESTRICTING GROOVE FORMED TO FULLY REACH LOWER CORE LAYER, AND MANUFACTURING METHOD FOR THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 922 days.

(21) Appl. No.: 09/610,558

(22) Filed: Jul. 5, 2000

(30) Foreign Application Priority Data

Jul. 6, 1999 (JP) .......................................... 11-191648

(51) Int. Cl.[7] .............................................. G11B 5/127
(52) U.S. Cl. ...................................................... 360/126
(58) Field of Search ............................... 360/125, 126, 360/119, 120

(56) References Cited

U.S. PATENT DOCUMENTS

| | | | |
|---|---|---|---|
| 5,350,629 A | * | 9/1994 | Chaug et al. ............... 428/336 |
| 5,363,265 A | * | 11/1994 | Hsie et al. ................... 360/327 |
| 5,452,164 A | | 9/1995 | Cole et al. |
| 5,649,351 A | | 7/1997 | Cole et al. |
| 5,652,687 A | | 7/1997 | Chen et al. |
| 5,802,700 A | | 9/1998 | Chen et al. |
| 6,198,597 B1 | * | 3/2001 | Tateyama et al. ........... 360/126 |
| 6,445,536 B1 | * | 9/2002 | Rudy et al. ................. 360/126 |
| 6,660,630 B1 | * | 12/2003 | Chang et al. ............... 438/637 |
| 6,737,281 B1 | * | 5/2004 | Dang et al. ..................... 438/3 |

FOREIGN PATENT DOCUMENTS

EP    256938 A2 *    2/1988    ........... B23K/26/14

* cited by examiner

*Primary Examiner*—William J Klimowicz
(74) *Attorney, Agent, or Firm*—Brinks Hofer Gilson & Lione (57) ABSTRACT

A stopper layer having an etching rate that is lower than a reactive ion etching rate of the insulating layer is provided between the lower core layer and the insulating layer. With this arrangement, a groove that fully reaches the lower core layer can be formed in the insulating layer, and a lower magnetic pole layer can be formed by being properly grown by plating in the groove.

5 Claims, 7 Drawing Sheets

THIN FILM MAGNETIC HEAD WITH TRACK WIDTH RESTRICTING GROOVE FORMED TO FULLY REACH LOWER CORE LAYER, AND MANUFACTURING METHOD FOR THE SAME

BACKGROUND OF THE INVENTION

1. Field of the Invention

The present invention relates to a recording thin film magnetic head employed with, for example, a flying magnetic head or the like and, more particularly, to a thin film magnetic head and its manufacturing method wherein a track width restricting groove that fully reaches a lower core layer can be securely and easily formed in an insulating layer interposed between the lower core layer and an upper core layer, and a magnetic pole layer or the like can be properly grown by plating in the groove.

2. Description of the Related Art

Figure 13:
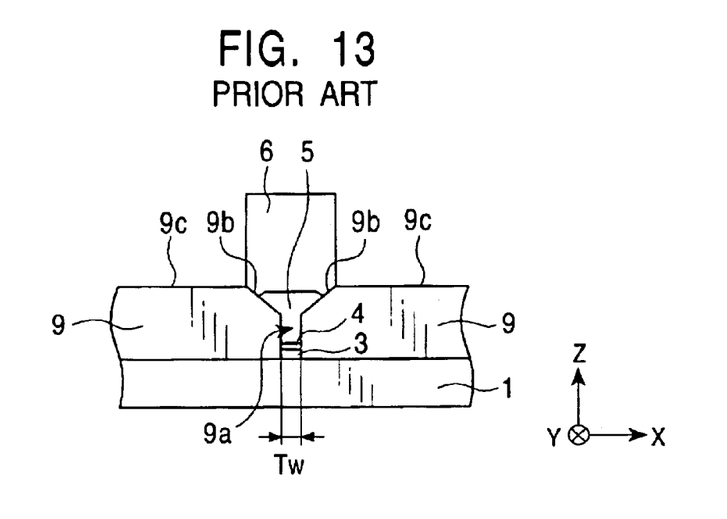
FIG. 13 is a partial front view showing a structure of an air bearing surface (ABS) of a conventional thin film magnetic head (inductive head) according to the prior art.

FIG. 13 is a partial front view of a conventional thin film magnetic head observed from a surface or an air bearing surface (ABS) opposing a recording medium.

The thin film magnetic head shown in FIG. 13 is a recording inductive head. A reproducing MR head may have been formed at a lower side of the inductive head in the drawing.

Reference numeral 1 shown in FIG. 13 denotes a lower core layer formed of a magnetic material. An insulating layer 9 formed of an insulating material, such as $SiO_2$, is formed on the lower core layer 1.

As shown in FIG. 13, a track width restricting groove 9a is formed in the insulating layer 9. In the track width restricting groove 9a, a lower magnetic pole layer 3 magnetically connected to the lower core layer 1, a gap layer 4, and an upper magnetic pole layer 5 magnetically connected to the upper core layer 6 are formed by plating in this order from a bottom of the groove.

The track width restricting groove 9a is formed from a top surface of the lower core layer 1 to a middle of the insulating layer 9. Slant surfaces 9b and 9b extend from both side upper ends of the groove 9a to a surface 9c of the insulating layer 9 such that an inner width of the groove 9a gradually increases from a track width Tw.

A part of the upper core layer 6 formed on the upper magnetic pole layer 5 so as to be magnetically connected thereto extends away from the lower core layer 1 from tops of the slant surfaces 9b and 9b formed on the insulating layer 9.

Figure 14:
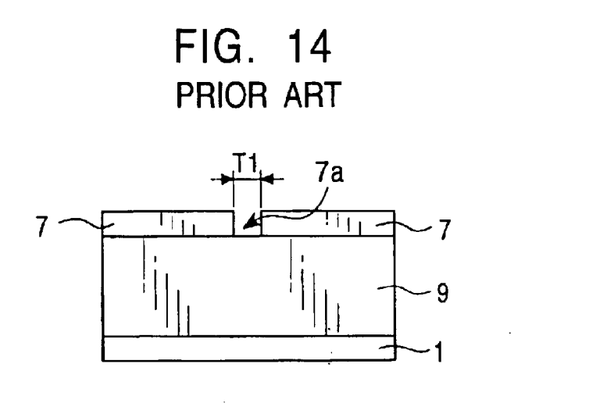
FIG. 14 shows the layers for making the conventional thin film magnetic head shown in FIG. 13.
Figure 15:
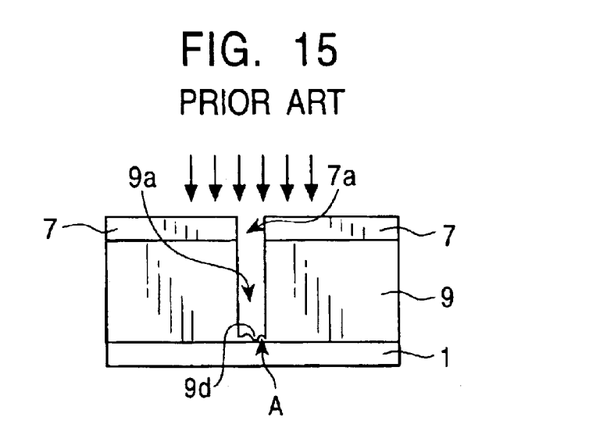
FIG. 15 shows the formation of a groove in the conventional thin-film magnetic head as shown in FIG. 13.

FIGS. 14 and 15 illustrate a method for forming the track width restricting groove 9a provided in the insulating layer 9 of the thin film magnetic head shown in FIG. 13.

In a process shown in FIG. 14, the insulating layer 9 composed of an insulating material, such as $SiO_2$, is first formed on the lower core layer 1. Then a resist layer 7 is formed on the insulating layer 9. Thereafter, a predetermined gap 7a is pattern-formed in the resist layer 7 by exposure. A width of the gap 7a is denoted by T1. The width T1 being formed substantially by a track width Tw.

In a step shown in FIG. 15, a portion of the insulating layer 9 that is exposed in the gap 7a provided in the resist layer 7 is etched by reactive ion etching (RIE) to form a track width restricting groove 9a. By the reactive ion etching, the track width restricting groove 9a is formed in a substantially constant width from a surface of the insulating layer 9 to a surface of the lower core layer 1. In this manner, the width of the groove 9a is defined as the track width Tw.

After the track width restricting groove 9a is formed, the slant surfaces 9b and 9b as shown in FIG. 13, for example, are formed. Then the lower magnetic pole layer 3, the gap layer 4, and the upper magnetic pole layer 5 are grown by plating in the track width restricting groove 9a.

However, according to the conventional structure of the thin film magnetic head and the conventional manufacturing method therefor, when forming the track width restricting groove 9a in the insulating layer 11 by reactive ion etching, it is difficult to form the track width restricting groove 9a that fully reaches the lower core layer 1. A part of the insulating layer 9 tends to remain in a spot indicated by A located between a bottom surface 9d of the track width restricting groove 9a and the lower core layer 1 as shown in FIG. 15.

The part of the insulating layer 9 left in the spot A between the track width restricting groove 9a and the lower core layer 1 causes a slowdown of plating growth of the lower magnetic pole layer 3 and frequently leads to peeling of the plating. The lower magnetic pole layer 3 is formed by plating in the track width restricting groove 9a and continues from the lower core layer 1, Furthermore, the presence of the insulating layer 9 between the lower core layer 1 and the lower magnetic pole layer 3 weakens the magnetic connection between the lower core layer 1 and the lower magnetic pole layer 3, resulting in deteriorated recording characteristics.

The following is a description of a major cause for the failure of forming the track width restricting groove 9a that completely reaches the surface of the lower core layer 1, which causes a part of the insulating layer 9 to be left in the track width restricting groove 9a. The insulating layer 9 is formed of a thick film, making it extremely disadvantageous in etching control. As the insulating layer 9 is etched by the reactive ion etching, undulation develops on the bottom surface 9d of the cut portion, namely, the track width restricting groove 9a as illustrated in FIG. 15. It is difficult to completely remove the insulating layer 9 in the track width restricting groove 9a mainly due to control of etching time. The etching control is even more difficult if the insulating layer 9 is formed of an insulating material, such as $SiO_2$,' that exhibits a high etching rate in the reactive ion etching.

SUMMARY OF THE INVENTION.

Accordingly, the present invention has been made with a view toward solving the problems described above. It is an object thereof to provide a thin film magnetic head and a manufacturing method for the same that make it possible to form a track width restricting groove formed in an insulating layer. The groove fully-reaches a lower core layer thereby to allow a magnetic pole layer or the like to be properly grown by plating in the groove, thus permitting improved recording characteristics to be achieved.

To this end, according to one aspect of the present invention, there is provided a thin film magnetic head comprising: a lower core layer; an upper core layer; at least one insulating layer positioned between the lower core layer and the upper core layer; and a track width restricting groove which is formed in the insulating layer and includes a lower magnetic pole layer continuing from the lower core layer and/or an upper magnetic pole layer continuing from the upper core layer, and a gap layer positioned between one of the core layers and one of the magnetic pole layers that opposes the core layer, or between the two magnetic pole layers.

A stopper layer is placed, in a portion excluding the track width restricting groove, between the lower core layer and the insulating layer. The stopper layer is formed of an insulating material having an etching rate lower than an etching rate of the insulating layer in reactive ion etching.

Thus, according to the present invention, the stopper layer composed of an insulating material exhibiting the etching rate lower than the etching rate for the reactive ion etching of the insulating layer is interposed between the insulating layer and the lower core layer. Furthermore, in this invention, the track width restricting groove provided in the insulating layer is formed to fully reach the surface of the lower core layer. Unlike the prior art described above, no insulating layer is left in the track width restricting groove.

Hence, the present invention makes it possible to form, in the groove, a lower magnetic pole layer magnetically connected to, for example, the lower core layer by properly performing growth by plating. This permits fabrication of a thin film magnetic head having good recording characteristics.

In a preferred form of the present invention, the stopper layer is thinner than the insulating layer.

In another preferred form of the present invention, an etching rate of the stopper layer in reactive ion etching is lower than an etching rate of the insulating layer by ten times or more. To be more specific, the insulating layer is formed of $SiO_2$, while the stopper layer is formed of $Al_2O$, and/or $Si_3N_4$.

According to another aspect of the present invention, there is provided a manufacturing method for a thin film magnetic head formed of a lower core layer, an insulating layer, and an upper core layer that are deposited in this order, comprising the steps of: forming a stopper layer which is composed of an insulating material on a lower core layer; forming, on the stopper layer, at least one insulating layer composed of an insulating material having an etching rate higher than a reactive ion etching rate of the insulating material used for the stopper layer; forming a mask on the insulating layer at a predetermined gap; etching the insulating layer exposed in the gap by reactive ion etching and removing the insulating layer until the stopper layer is exposed so as to form a track width restricting groove; removing the stopper layer exposed in the track width restricting groove by the reactive ion etching to expose the lower core layer; forming a lower magnetic pole layer continuing from the lower core layer and a gap layer on a lower magnetic pole layer, or forming the gap layer on the lower core layer, in the track width restricting groove; and forming an upper magnetic pole layer on the gap layer and forming an upper core layer on the upper magnetic pole layer, or forming the upper core layer directly on the gap layer, in the track width restricting groove.

Thus, according to the present invention, the stopper layer is formed on the lower core layer. The insulating layer composed of an insulating material having an etching rate higher than the reactive ion etching rate of an insulating material used for the stopper layer is formed on the stopper layer.

Furthermore, according to the present invention, the track width restricting groove is formed in the insulating layer by the reactive ion etching by making use of a mask, such as a resist, formed on the insulating layer. In the etching process according to the invention, the insulating layer is removed until the stopper layer is exposed thereby to form the track width restricting groove. In other words, the insulating layer is removed by the etching process so that no insulating layer portion is left in the track width restricting groove.

Thus, according to the invention, upon completion of the reactive ion etching, the stopper layer is left between a bottom surface of the track width restricting groove and the lower core layer.

According to the invention, the stopper layer left at the bottom of the track width restricting groove is removed by the reactive ion etching to expose a surface of the lower core layer.

In a preferred form of the invention, when etching the insulating layer by the reactive ion etching, over-etching is performed to etch the insulating layer more than a thickness of the insulating layer so as to completely remove the insulating layer in the gap, thereby forming the track width restricting groove. Preferably, the over-etching is carried out in such a manner that the stopper layer is left at the bottom of the track width restricting groove.

Thus, the insulating layer can be over-etched owing to the stopper layer provided under the insulating layer.

When the over-etching is carried out on the insulating layer, a portion of the insulating layer where the track width restricting groove is to be formed should be completely eliminated. If, however, an etching time is still left after completely removing the insulating layer, then a layer existing under the insulating layer is also etched by the reactive ion etching. In the present invention, the stopper layer is provided under the insulating layer; therefore, a portion over-etched due to a remaining etching time is the stopper layer. The presence of the stopper layer enables proper protection of the lower core layer positioned under the stopper layer from being etched. Upon completion of the over-etching process, the stopper layer is left between the bottom surface of the track width restricting groove and the lower core layer.

In the present invention, since the stopper layer is formed of an insulating material having a lower etching rate for the reactive ion etching than that for the insulating layer, the stopper layer is less likely to be etched as compared with the insulating layer even if the insulating layer has been completely removed, leaving the stopper layer to be etched next.

However, if the stopper layer is formed of an excessively thin film, allowing the stopper layer to be completely removed by the over-etching, causing the lower core layer to be affected by the over-etching. In order to prevent this undesirable situation, it is preferred in the invention to control the over-etching so that the stopper layer is left at the bottom of the track width restricting groove.

Preferably, the stopper layer is formed of a thin film that survives over-etching. This permits easier etching control, making it possible to fully remove the stopper layer left at the bottom of the track width restricting groove.

In order to securely leave the stopper layer at the bottom of the track width restricting groove when over-etching the insulating layer, it is necessary to consider etching rates, over-etching amounts, and other factors of the stopper layer and the insulating layer. For this reason, in the present invention, a film thickness of the stopper layer is determined by the following expression.

In a preferred form of the invention, a thickness of a film of the insulating layer formed on the stopper layer, which film is to be removed by the reactive ion etching, is denoted as X1. A ratio of an etching rate of the insulating layer to an etching rate of the stopper layer is set to Y:1. An over-etching amount for the film thickness X1 of the insulating layer is denoted as N%. It is preferable to set a film thickness X2 of the stopper layer to $X2 \geq (X1 \cdot N)/(Y \cdot 100)$. The over-etching amount is determined as follows. It is assumed that the same material as that used for the insulating layer is over-etched, exceeding the film thickness X1. The amount of the material etched, exceeding the film thickness X1, indicates the over-etching amount, which is expressed by X1·N/100.

By forming the stopper layer by using a dimension value calculated according to the above expression, the stopper layer will be securely left at the bottom of the track width restricting groove even if over-etching of N% is performed. This makes it possible to avoid a risk of the stopper layer being completely removed and the surface of the lower core layer being etched when the over-etching of N% is carried out.

In another preferred form of the invention, the etching rate for the insulating material used for the stopper layer is lower than the etching rate for the insulating material used for the insulating layer by ten times or more. An insufficient difference between the etching rate for the insulating layer and the etching rate for the stopper layer makes it difficult to control the etching. A part of the insulating layer or the stopper layer is apt to be left in a place between the bottom surface of the track width restricting groove and the surface of the lower core layer as in the case of the prior art. For this reason, the etching rate for the stopper layer must be appropriately lower than the etching rate for the insulating layer. According to the present invention, setting the etching rate for the stopper layer so that it is lower than the etching rate of the insulating layer by ten times or more makes it possible to properly and easily form a track width restricting groove that fully reaches the lower core layer.

To be more specific, it is preferable to use $SiO_2$ for forming the insulating layer, and to use $Al_2O_3$ and/or $Si_3N_4$ for forming the stopper layer.

DESCRIPTION OF THE PREFERRED EMBODIMENTS

Figure 1:
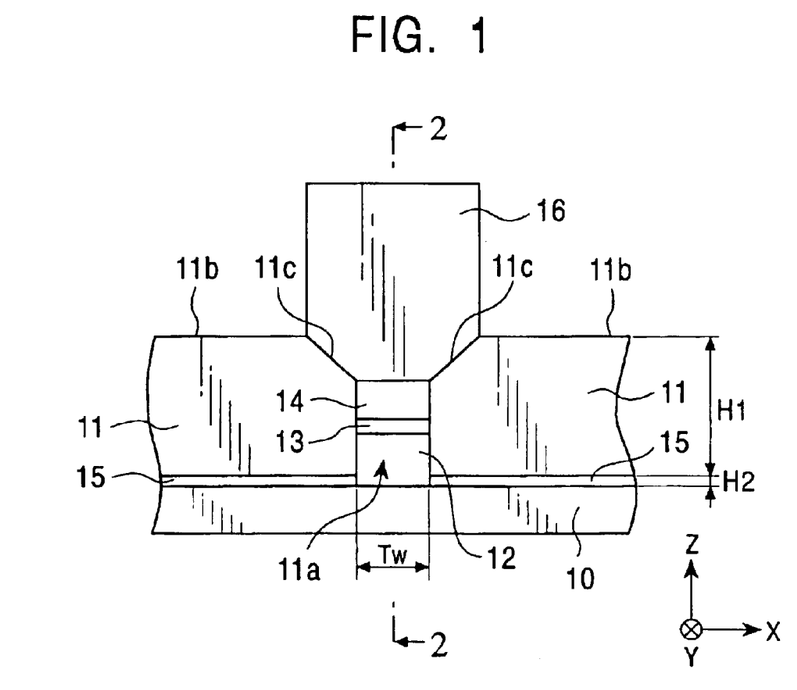
FIG. 1 is a partial front view showing a structure of an air bearing surface (ABS) of a thin film magnetic head (inductive head) according to a first embodiment of the present invention.
Figure 2:
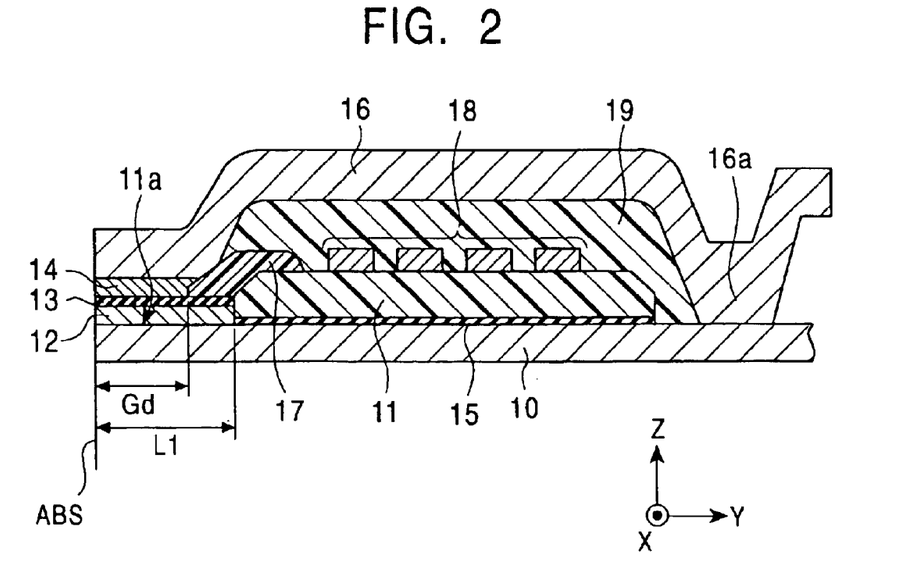
FIG. 2 is a partial sectional view of the thin film magnetic head cut along a line 2—2 shown in FIG. 1, as observed from a direction indicated by arrows.

FIG. 1 is a partial front view showing a structure of a thin film magnetic head in accordance with a first embodiment of the present invention. FIG. 2 is a partial sectional view of the thin film magnetic head cut along a line 2—2 shown in FIG. 1, as observed from a direction indicated by arrows.

The thin film magnetic head shown in FIG. 1 and FIG. 2 is an "inductive head" for writing. The inductive head is deposited on a read head utilizing magnetoresistance effect.

The read head is constituted by, for example, a magnetoresistive element formed of a GMR device utilizing giant magnetoresistance effect. Shielding typically represented by a spin valve film or an AMR device utilizing anisotropic magnetoresistance effect. Shielding layers are formed above and beneath the magnetoresistive element via gap layers.

A lower core layer 10 shown in FIGS. 1 and 2 is formed of a soft magnetic material, such as a Fe-Ni type alloy or Permalloy, that features high permeability.

In the invention, as shown in FIGS. 1 and 2, an insulating layer 11 composed of an insulating material is formed on the lower core layer 10 via a stopper layer 15 composed of an insulating material.

Preferably, the insulating material used for the insulating layer 11 is at least one selected from among AlO, $SiO_2$, $Ta_2O_5$, TiO, AlN, AlSiN, tiN, SiN, NiO, WO, $WO_3$, BN, CrN, and SiON. The insulating layer 11 may be formed of a single-layer film or a multi-layer film.

Further preferably, as shown in FIG. 1, a thickness of the insulating layer 11 is formed by a film thickness H1. To be more specific, the thickness H1 ranges from about 1.0 $\mu$m to about 4.0 $\mu$m.

Furthermore, as shown in FIGS. 1 and 2, the insulating layer 11 has a track width restricting groove 11a formed to have a width of at least a track width Tw. The track width restricting groove 11a has a predetermined length L1 in a direction of height (a Y direction shown in the drawing) from an air bearing surface (ABS) opposing a recording medium.

In the track width restricting groove 11a in an embodiment illustrated id FIGS. 1 and 2, a lower magnetic pole layer 12 continuing from the lower core layer 10 is formed by plating as a bottommost layer. A gap layer 13 composed of a nonmagnetic metal material is formed by plating on the lower magnetic pole layer 12. An upper magnetic pole layer 14 continuing from an upper core layer 16, which will be discussed hereinafter, is formed by plating on the gap layer 13. The lower magnetic pole layer 12 and the upper magnetic pole layer 14 are magnetically connected to the lower core layer 10 and the upper core layer 16, respectively.

The multilayer construction formed in the track width restricting groove 11a may be different from the one described above. According to the present invention, any other construction may be employed as long as the track width restricting groove 11a includes the lower magnetic pole layer 12 continuing from the lower core layer 10 and/or the upper magnetic pole layer 14 continuing from the upper core layer 16, and the gap layer 13 positioned between either the core layer 10 or 16 and the magnetic pole layer 12 or 14 that opposes the core layer, or between the two magnetic pole layers 12 and 14.

The width of the track width restricting groove 11a formed in the insulating layer 11 is defined as the track width Tw. As shown in FIG. 1, for example, when the gap layer 13 and the magnetic pole layers 12 and 14 opposing each other through the intermediary of the gap layer 13 are formed in the track width restricting groove 11a, a leakage field produced between the magnetic pole layers 12 and 14 stays within the track width Tw, permitting good recording characteristics to be maintained.

In the present invention, the track width restricting groove 11a formed in the insulating layer 11 can be formed at the width, namely, the track width Tw, of 1.0 μm or less, and preferably, to 0.7 μm or less.

In the embodiment shown in FIG. 1, the insulating layer 11 has slant surfaces 11c and 11c that incline such that an interval therebetween gradually increases from the track width Tw from top edges of both sides of the track width restricting groove 11a toward a surface 11b of the insulating layer 11. The upper core layer 16 is formed by plating from a top surface of the upper magnetic pole layer 14 formed in the track width restricting groove 11a to a level above the slant surfaces 11c. The slant surfaces 11c are formed to allow an appropriate distance between the core layer 16 and the lower magnetic pole layer 12 formed under, for example, the gap layer 13, thereby properly preventing write fringing.

In the present invention, the stopper layer 15 formed of an insulating material is provided between a portion of the insulating layer 11 excluding the track width restricting groove 11a, and the lower core layer 10 as shown in FIGS. 1 and 2.

The insulating material used for the stopper layer 15 may be selected from among the insulating materials used for the insulating layer 11 listed above on condition that the etching rate for the reactive ion etching of the insulating material used at least for the stopper layer 15 is lower than the etching rate of the insulating material used for the insulating layer 11.

Preferably, the reactive ion etching rate of the stopper layer 15 is lower than the etching rate of the insulating layer 11 by ten times or more.

For instance, the insulating layer 11 is formed of $SiO_2$' while the stopper layer 15 is formed of $Al_2O$, and/or $Si_3N_4$.

If the insulating layer 11 is formed of $SiO_2$, the stopper layer 15 is formed of $Al_2O_3$, and $C_3F_8+(Ar)$ is used as a gas for the reactive ion etching, then the etching rate of the stopper layer 15 for the reactive ion etching can be set to be lower than the etching rate of the insulating layer 11 about fifteen times.

Likewise, if the insulating layer 11 is formed of $SiO_2$, the stopper layer 15 is formed of $Si_3N_4$, and $C_5F_8+(Ar)$ is used as a gas for the reactive ion etching, then the etching rate of the stopper layer 15 for the reactive ion etching can be set to be lower than the etching rate of the insulating layer 11 by about fifteen times.

Furthermore, in the present invention, a film thickness H2 of the stopper layer 15 is preferably smaller than the film thickness H1 of the insulating layer 11. If the stopper layer 15 is excessively thick, then the stopper layer 15 is likely to remain in the track width restricting groove 11a when the track width restricting groove 11a is formed in the insulating layer 11 according to a manufacturing method, which will be discussed hereinafter. This prevents the track width restricting groove 11a from fully reaching the lower core layer 10.

In the present invention, as shown in FIG. 2, a predetermined gap (Gd) is provided on the gap layer 13 formed in the track width restricting groove 11a of the insulating layer 11. The gap (Gd) extends in a direction of height (Y direction in the drawing) from an ABS. A Gd-deciding insulating layer 17 is formed on a portion of the gap layer 13 at the rear of the gap and on a portion of the stopper layer 15 positioned at a height side. The Gd-deciding insulating layer 17 is formed of an organic resin material, such as polyimide or a resist constituent.

The Gd deciding insulating layer 17 is provided to decide the gap depth Gd. The gap depth Gd must be set to a proper dimension because the gap depth Gd greatly influences electrical characteristics of the thin film magnetic head.

Thus, in the invention, the Gd deciding insulating layer 17 is formed on the gap layer 13 in order to set the gap depth Gd to a predetermined dimension. In another mode of the invention, if the length L1 of the track width restricting groove 11a formed in the insulating layer 11 is set as the gap depth Gd, then the length L1 of the track width restricting groove 11a provides the gap depth Gd. In this case, there is no need to form the Gd deciding insulating layer 17.

Referring to FIG. 2, a coil layer 18 is spirally patterned on the insulating layer 11. In the embodiment shown in FIG. 2, the coil layer 18 is directly formed on the insulating layer 11. Alternatively, however, the aforesaid Gd-deciding insulating layer 17 may be formed between the coil layer 18 and the insulating layer 11.

Furthermore, a coil insulating layer 19 is formed on the coil layer 18 such that it covers the coil layer 18. The coil insulating layer 19 is composed of a resist constituent, polyimide, or other organic resin constituent.

As shown in FIG. 2, the upper core layer 16 described above is formed so that it extends in the height direction from the ABS. A proximal end portion 16a of the upper core layer 16 is formed on and magnetically connected to the lower core layer 10.

In the thin film magnetic head shown in FIG. 1, when a recording current is supplied to the coil layer 18, a recording magnetic field is induced at the lower core layer 10 and the upper core layer 16. A leakage field is produced between the lower magnetic pole layer 12 and the upper magnetic pole layer 14 that oppose each other via the gap layer 13. Magnetic signals are recorded on a recording medium, such as a hard disk, by the leakage field.

Figure 3:
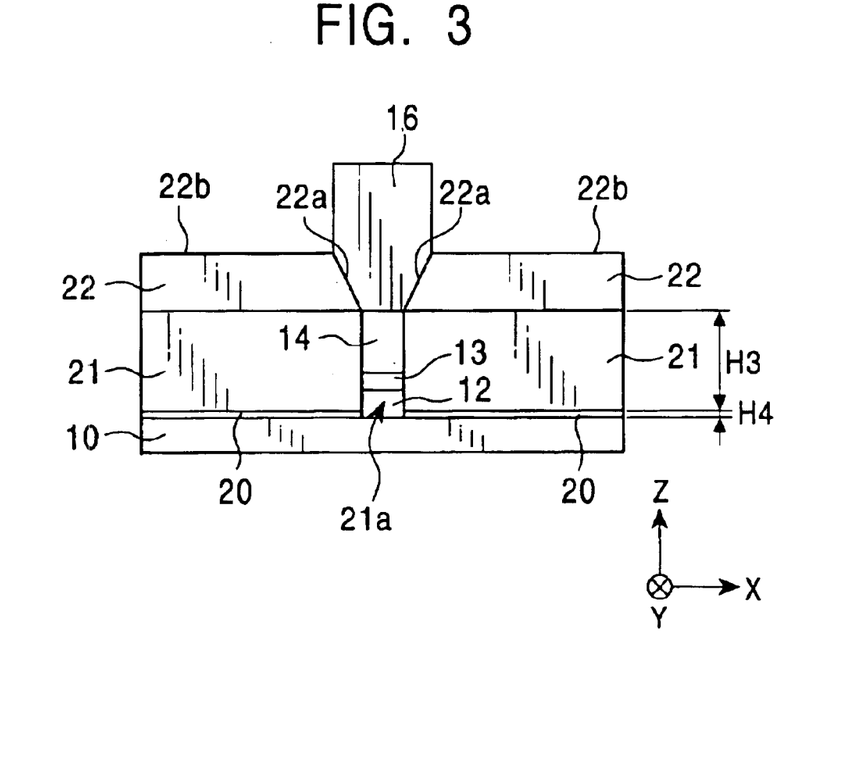
FIG. 3 is a partial front view showing a structure of an air bearing surface (ABS) a thin film magnetic head according to a second embodiment of the present invention.

FIG. 3 is a partial front view showing a thin film magnetic head according to a second of the present invention embodiment.

In this embodiment, a main insulating layer 21 and an auxiliary insulating layer 22 are formed in succession on a lower core layer 10 via a stopper layer 20 composed of an insulating material.

In a preferred form of the invention, the etching rate for the reactive ion etching of the main insulating layer 21 is set to be higher than the etching rates of the stopper layer 20 and the auxiliary insulating layer 22. For example, the main insulating layer 21 is formed of $SiO_2$, while the stopper layer 20 and the auxiliary insulating layer 22 are formed of $Al_2O_3$ and/or $Si_3N_4$.

Preferably, a film thickness H4 of the stopper layer 20 is smaller than a film thickness H3 of the main insulating layer 21.

Referring to FIG. 3, the main insulating layer 21 has at least a track width restricting groove 21a. In the groove 21a, a lower magnetic pole layer 12 magnetically connected to the lower core layer 10, a gap layer 13, and an upper magnetic pole layer 14 magnetically connected to an upper core layer 16 are formed by plating in this order from bottom.

As shown in FIG. 3, the auxiliary insulating layer 22 has slant surfaces 22a and 22a that incline such that an interval therebetween increases toward a surface 22b of the auxiliary insulating layer 22 from top edges of both sides of the track width restricting groove 21a formed in the main insulating layer 21. The upper core layer 16 is formed by plating from a top surface of the upper magnetic pole layer 14 to a level above the slant surfaces 22a.

A width of the track width restricting groove 21a formed in the main insulating layer 21 described above is defined as a track width Tw. According to the invention, the track width Tw can be set to a value that is smaller than a limit value of a resist exposure. To be more specific, the track width Tw can be set to 0.7 $\mu$m, or preferably 0.5 $\mu$m or less, or more preferably 0.3 $\mu$m or less.

The upper core layer 16 is formed on the slant surfaces 22a formed on the auxiliary insulating layer 22. The slant surfaces 22a are formed to allow an appropriate distance between the upper core layer 16 and the lower magnetic pole layer 12 formed under the gap layer 13, thereby preventing write fringing.

In this embodiment also, a stopper layer 20 is placed between the main insulating layer 21 excluding a portion of the track width restricting groove 21a and the lower core layer 10. The presence of the stopper layer 20 permits easy control of reactive ion etching used for forming the track width restricting groove 21a.

In the structures of the thin film magnetic heads shown in FIGS. 1 and 3, the track width restricting groove formed in the insulating layer or the main insulating layer is formed to fully reach the lower core layer 10. Hence, unlike the prior art, no insulating layer is left in the track width restricting groove.

Thus, the structures of the thin film magnetic heads in accordance with the present invention allow the lower magnetic pole layer 12 or the gap layer 13 to be properly formed by plating in the grooves without interfering with plating growth. This makes it possible to maintain good recording characteristics.

A manufacturing method for the thin film magnetic head shown in FIG. 1 will now be described. FIG. 4 through FIG. 8 illustrate processing steps for the thin film magnetic head in accordance with the present invention.

Figure 4:
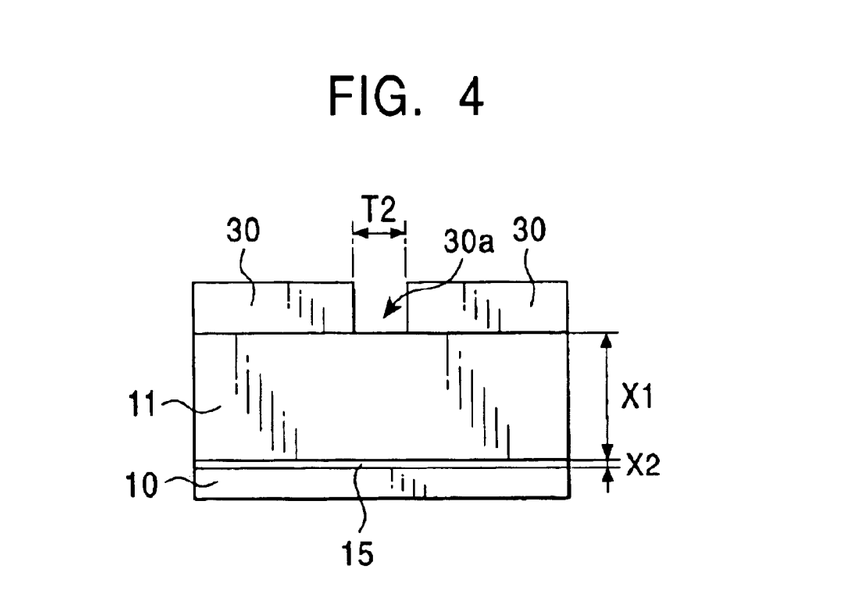
FIG. 4 shows the layers for making the thin film magnetic head shown in FIG. 1.

Referring to FIG. 4, first, the stopper layer 15 composed of an insulating material is formed on the lower core layer 10. The insulating layer 11 composed of an insulating material having a reactive ion etching rate higher than a reactive ion etching rate of the insulating material used for the stopper layer 15 is formed on the stopper layer 15. In other words, the insulating materials used for the stopper layer 15 and the insulating layer 11 must be selected so that the etching rate for the reactive ion etching of the stopper layer 15 is lower than that of the insulating layer 11.

In the present invention, it is preferable that the etching rate of the insulating material used for the stopper layer 15 is lower than the etching rate of the insulating material used for the insulating layer 11 by ten times or more. To meet this requirement, it is preferable to form the insulating layer 11 by using $SiO_2$ and the stopper layer 15 by using $Al_2O_3$ and/or $Si_3N_4$. This enables the etching rate of the stopper layer 15 to be lower than the etching rate of the insulating layer 11 by approximately fifteen times.

Subsequently, a resist layer 30 is applied onto the insulating layer 11 by spin coating. A predetermined gap 30a is pattern-formed in the resist layer 30 by exposure as shown in FIG. 4.

A width of the gap 30a is denoted as T2. The width T2 is virtually formed by a track width Tw.

Figure 5:
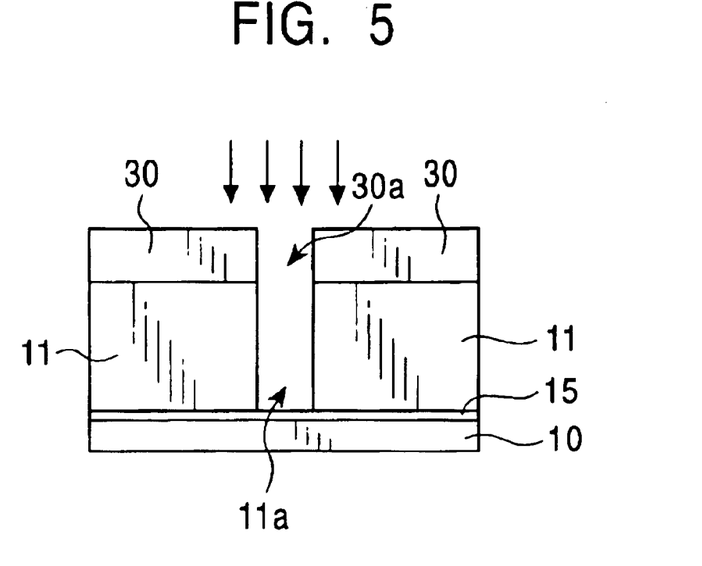
FIG. 5 shows the formation of a groove in the insulating layer of a thin-film magnetic head as shown in FIG. 1.

Then, as shown in FIG. 5, a portion of the insulating layer 11 that is exposed in the gap 30a provided in the resist layer 30 is etched by reactive ion etching (RIE) to form a track width restricting groove 11a in the insulating layer 11.

According to the present invention, it is preferable to perform over-etching on a film thickness X1 (See FIG. 4) of the insulating layer 11 exposed in the gap 30a in the reactive ion etching step.

In the present invention, an over-etching amount is denoted as N%. The over-etching amount is determined as follows: when it is assumed that the same material as that used for the insulating layer 11 is over-etched, exceeding the film thickness X1, the over-etching amount is determined from an amount (X1·N/100) by which the material is etched, exceeding the film thickness X1.

To perform the over-etching of N% as described above, it is necessary to properly set an etching time, taking an etching rate, and other factors into account.

For instance, when the insulating layer 11 is formed to have the film thickness X1 of 2 $\mu$m (20000 angstroms), an over-etching of 10%, i.e., 2000 angstroms, is performed on the film thickness X1. If the reactive ion etching rate of the insulating material used for the insulating layer 11 is 1000 angstroms per minute, then the etching time is calculated by [Film thickness X1 (20000 angstroms) of the insulating layer 11+Over-etching amount (2000 angstroms)]/[Etching rate (1000 angstroms per minute) of the insulating layer 11]. The calculated etching time is 22 minutes. Theoretically, the insulating layer 11 having the film thickness X1 of 2 $\mu$m can be completely removed from its top to bottom surfaces by etching in 20 minutes, leaving two minutes for the over-etching.

Referring to the foregoing example, however, the 20 minute etching cannot completely remove the insulating layer 11 by etching from its top to bottom surfaces. A part of the insulating layer 11 remains in the track width restricting groove 11a formed by the etching. This happens because the insulating layer 11 is formed of a large film thickness X1, making it extremely difficult to control the etching. As the insulating layer 11 exposed in the gap 30a of the resist layer 30 is etched, an easy-to-etch portion and a difficult-to-etch portion are encountered. Therefore, etching for the calculated etching time that theoretically permit the insulating layer 11 to be completely removed results in a part of the insulating layer 11 being left in the track width restricting groove 11a formed by the etching.

As a solution to the above problem, the over-etching is carried out in the present invention. More specifically, in the case of the example described above 20-minute etching is extended to 22-minute etching so as to perform 10% over-etching on the film thickness X1 of the insulating layer 11.

Performing the over-etching fully removes the portion of the insulating layer 11 where the track width restricting groove 11a is to be formed, leaving no insulating layer 11 in the track width restricting groove 11a.

If there is still an etching time left after the over-etching is carried out to fully remove the insulating layer 11, then a layer under the insulating layer 11 is etched.

According to the present invention, the stopper layer 15 composed of an insulating material is provided under the insulating layer 11. Hence, after the insulating layer 11 has been completely eliminated, the next layer to be etched is the stopper layer 15 lying under the insulating layer 11. In the invention, the reactive ion etching rate of the stopper layer 15 is set to be lower than the etching rate of the insulating layer 11 as set forth above. Hence an amount etched from the stopper layer 15 by the over-etching is small. As shown in FIG. 5, at the end of the over-etching, the stopper layer 15 remains between a bottom surface of the track width restricting groove 11a formed in the insulating layer 11 and the lower core layer 10.

The stopper layer 15 is provided to protect the lower core layer 10 from etching when the insulating layer 11 is over-etched to completely remove the portion of the insulating layer 11 that turns into the track width restricting groove 11a. Therefore, it is necessary to properly set a film thickness X2 (See FIG. 4) of the stopper layer 15 beforehand so that the stopper layer 15 is left between the lower core layer 10 and the bottom surface of the track width restricting groove 11a after over-etching is performed.

To be more specific, according to the invention, a thickness of a film of the insulating layer formed on the stopper layer, which film is to be removed by the reactive ion etching, is denoted as X1. A ratio of an etching rate of the insulating layer to an etching rate of the stopper layer is set to Y:1. An over-etching amount for the film thickness X1 of the insulating layer is denoted as N%. It is preferable to set a film thickness X2 of the stopper layer to $X2 \geq (X1 \cdot N)/(Y \cdot 100)$. With this arrangement, even when over-etching is implemented, the stopper layer 15 will remain between the bottom surface of the track width restricting groove 11a formed in the insulating layer 11 and the surface of the lower core layer 10.

For instance, when the insulating layer 11 is formed to have the film thickness X1 of 2 $\mu$m (20000 angstroms) and a ratio of the etching rate of the insulating layer 11 to the etching rate of the stopper layer 15 (Y:1) is set to 10:1, and an over-etching amount N is set to 10%, then a film thickness H2 of the stopper layer 15 may be set to $(20000 \times 10)/(10 \times 100) = 200$ angstroms or more.

A minimum value of the film thickness X2 of the stopper layer 15 calculated by the above expression may vary depending on an over-etching amount and an etching rate ratio. It can be seen, however, that the minimum value is set to be sufficiently smaller than the film thickness X1 of the insulating layer 11. As long as the stopper layer 15 is formed to have a film thickness that is slightly larger than the above minimum value, the stopper layer 15 can be securely left between the bottom surface of the track width restricting groove 11a and the lower core layer 10 even when over-etching is performed. Conversely, if the stopper layer 15 is formed to excessively thick, then the following problem will arise.

The stopper layer 15 lying between the lower core layer 10 and the bottom surface of the track width restricting groove 11a formed in the insulating layer 11 is eventually eliminated by reactive ion etching, as it will be discussed hereinafter. If the stopper layer 15 is formed to have a much larger thickness than the thickness obtained by the above expression, then the stopper layer 15 will remain still thick at the end of the over-etching on the insulating layer 11.

The above situation makes it difficult to control the reactive ion etching for removing the stopper layer 15, leading to the same problem with the prior art. More specifically, the stopper layer 15 cannot be properly removed, and it is very likely that a part of the stopper layer 15 is left on the lower core layer 10 in the track width restricting groove 11a. For this reason, in the invention, the stopper layer 15 is formed to have a proper film thickness that allows the stopper layer 15 to be left at least on the lower core layer 10 after the insulating layer 11 is over-etched.

Thus, in the step illustrated in FIG. 5, the over-etching of N% is performed on the film thickness of the insulating layer 11. The insulating layer 11 exposed in the gap 30a provided in the resist layer 30 is removed by fully etching the insulating layer 11 from its top to bottom surfaces thereby to expose a top surface of the stopper layer 15 at the bottom surface of the track width restricting groove 11a formed by the etching.

Figure 6:
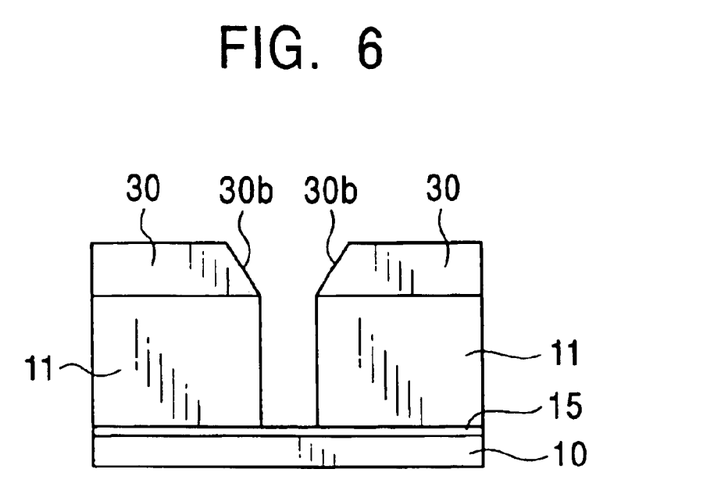
FIG. 6 shows the formation of slant surfaces on the resist layer of a thin-film magnetic head as shown in FIG. 1.

In the next step, impurities on both side surfaces of the track width restricting groove 11a formed in the insulating layer 11 are removed by cleaning with, for example, warm water. Then, as shown in FIG. 6, the resist layer 30 is subjected to post baking, and slant surfaces 30b and 30b that incline such that an interval therebetween gradually increases away from the lower core layer 10 are formed on both end surfaces of the resist layer 30.

Figure 7:
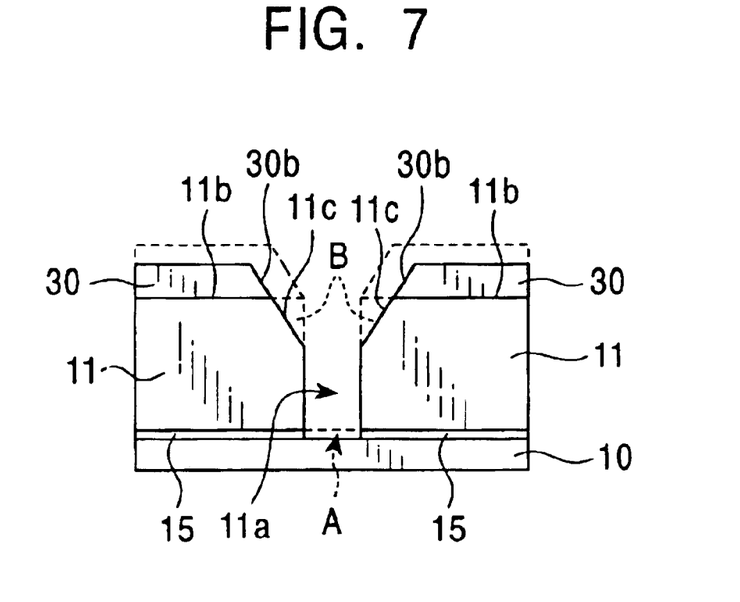
FIG. 7 shows the removal of the stopper layer of a thin-film magnetic head as shown in FIG. 1.

In a step illustrated in FIG. 7, the stopper layer 15 (a portion denoted by A) exposed at the bottom surface of the track width restricting groove 11a formed in the insulating layer 11 is removed by the reactive ion etching. The stopper layer 15 is properly removed by accurately controlling an etching time, considering the film thickness of the stopper layer 15, the etching rate of the stopper layer 15 and other factors.

As previously discussed, the stopper layer 15 is formed of a thin film that remains on the lower core layer 10 when the insulating layer 11 is over-etched by N%. Furthermore, the reactive ion etching rate of the insulating material used for the stopper layer 15 is lower than the etching rate of the insulating material used for the insulating layer 11.

Thus, the present invention permits easier etching control, so that the stopper layer 15 having a lower etching rate can be gradually cut by the reactive ion etching thereby to completely and easily remove the stopper layer 15 of the thin film.

In the step shown in FIG. 7, a portion (indicated by B) of the insulating layer 11 is also removed. Both end surfaces of the resist layer 30 formed on the insulating layer 11 are formed into the slant surfaces 30b by post baking in the step illustrated in FIG. 6. Therefore, the resist layer 30 and the insulating layer 11 formed thereunder are cut aslant. Thus, the slant surfaces 11c and 11c connected to the slant surfaces 30b and 30b of the resist layer 30 are formed on the insulating layer 11.

According to the invention, the etching rate for the reactive ion etching of the insulating layer 11 is higher than the etching rate of the stopper layer 15. Hence, during the reactive ion etching in the step illustrated in FIG. 7, only the thin film portion indicated by A of the stopper layer 15 is removed, while a larger portion than the portion A is removed from the insulating layer 11. This makes it possible to form, on the insulating layer 11, the slant surfaces 11c that are sufficiently large to effectively restrain the occurrence of write fringing.

As set forth above, in the step shown in FIG. 7, the stopper layer 15 left on the lower core layer 10 in the track width restricting groove 11a is fully removed by the reactive ion etching. The slant surfaces 11c and 11c that have the gap therebetween gradually increasing from a middle of the track width restricting groove 11a to the surfaces 11b and 11b of the insulating layer 11 are formed on the insulating layer 11 at the same time.

Figure 8:
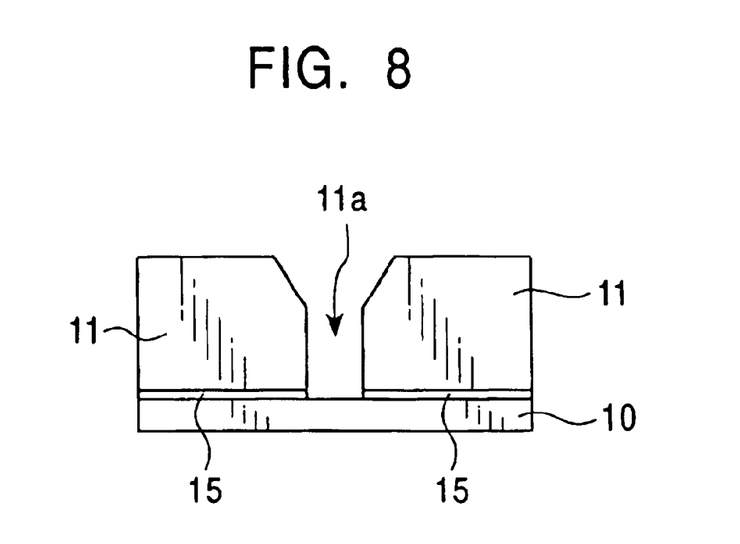
FIG. 8 shows the removal of the resist layer from a thin-film magnetic head as shown in FIG. 1.

In a step illustrated in FIG. 8, the resist layer 30 left on the insulating layer 11 is removed. Furthermore, impurities or the like on both side surfaces of the track width restricting groove 11a are properly removed by acid treatment or the like.

In the manufacturing method for the thin film magnetic head in accordance with the present invention described in detail above, the stopper layer 15 formed of an insulating material having an etching rate that is lower than an reactive ion etching rate of the insulating layer 11 is provided between the lower core layer 10 and the insulating layer 11.

The stopper layer 15 is preferably formed to have a thickness that allows the stopper layer 15 to remain on the lower core layer 10 when the insulating layer 11 is over-etched by N%.

In the present invention, when forming the track width restricting groove 11a in the insulating layer 11 by the reactive ion etching, the over-etching is performed to thereby completely remove the insulating layer 11 in the track width restricting groove 11a, causing the top surface of the stopper layer 15 to be exposed at the bottom of the track width restricting groove 11a. Even when the over-etching is carried out, since the reactive ion etching rate of the stopper layer 15 is lower, the stopper layer 15 lying under the track width restricting groove 11a is not entirely removed. The stopper layer 15 remains between the bottom surface of the track width restricting groove 11a and the lower core layer 10.

Then, the stopper layer 15 is eliminated by the reactive ion etching. The stopper layer 15 is formed of an insulating material having a lower etching rate and formed to have a thin film that allows the stopper layer 15 to remain on the lower core layer 10 after over-etching. With this arrangement, easier etching control can be conducted, and the stopper layer 15 provided under the track width restricting groove 11a can be fully and easily removed.

The track width restricting groove 11a formed as described above fully reaches the surface of the lower core layer 10, leaving neither the insulating layer 11 nor the stopper layer 15 in the track width restricting groove 11a.

Furthermore, in the present invention, the lower magnetic pole layer 12 magnetically connected to the lower core layer 10 shown in FIG. 1 is formed by plating in the track width restricting groove 11a.

The insulating layer 11 and the stopper layer 15 in the track width restricting groove 11a are completely removed and none of the layers are left therein as described above. This allows the lower magnetic pole layer 12 to be ideally grown by plating on the lower core layer 10, permitting reliable magnetic connection between the lower core layer 10 and the lower magnetic pole layer 12.

Then, the gap layer 13 and the upper magnetic pole layer 14 are formed in succession by plating on the lower magnetic pole layer 12. The upper core layer 16 is formed by plating so that it extends from a top of the upper magnetic pole layer 14 to the slant surfaces 11c and 11c formed on the insulating layer 11. This completes the thin film magnetic head.

In the invention, the gap layer 13 may be directly formed by plating on the lower core layer 10 in the groove 11a. The upper core layer 16 may be directly formed by plating on the gap layer 13.

In the above manufacturing method, the reactive ion etching is performed to remove the stopper layer 15 so that it is exposed in the track width restricting groove 11a and also to form the slant surfaces 11c and 11c on the insulating layer 11 in the same step shown in FIG. 7. Alternatively, however, the removal of the stopper layer 15 and the formation of the slant surfaces 11c and 11c may be performed in separate steps.

As another alternative, the insulating layer 11 and the stopper layer 15 may be simultaneously removed in the single reactive ion etching step, considering all factors, such as the film thicknesses of the insulating layer 11 and the stopper layer 15, and an etching rate of each layer.

FIG. 9 through FIG. 12 illustrate processing steps of the manufacturing method for the thin film magnetic head shown in FIG. 3.

Figure 9:
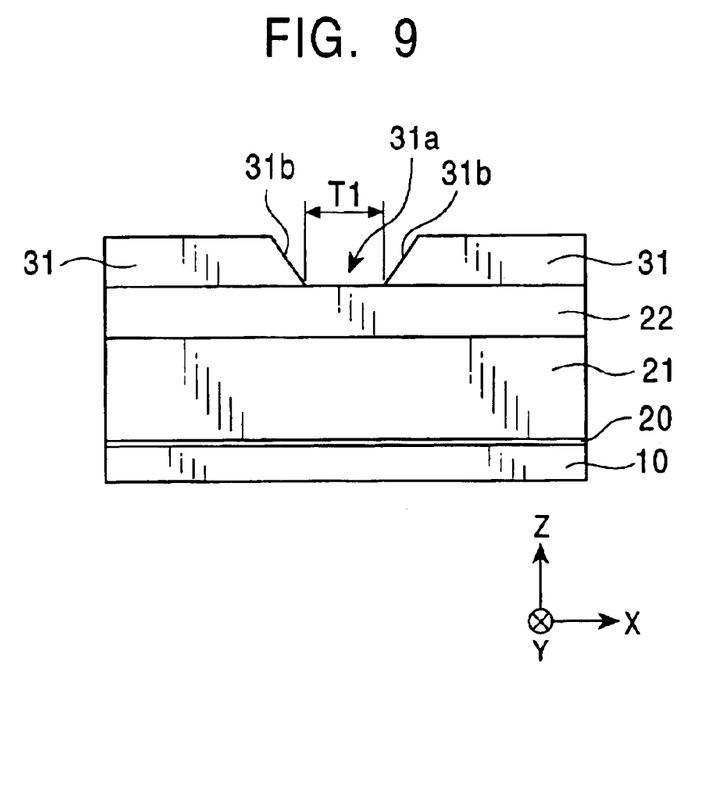
FIG. 9 shows the layers for making for the thin film magnetic head shown in FIG. 3.

In the step shown in FIG. 9, a stopper layer 20 composed of an insulating material is first formed on the lower core layer 10 main insulating layer 21 is formed on the stopper layer 20. An auxiliary insulating layer 22 is further formed on the main insulating layer 21.

According to the invention, an insulating material having an etching rate lower than the reactive ion etching rate of an insulating material employed for the main insulating layer 21 is selected for the stopper layer 20 and the auxiliary insulating layer 22.

Preferably, the etching rate of the insulating material used for the stopper layer 15 and the auxiliary insulating layer 22 is lower than the etching rate of the insulating material employed for the main insulating layer 21 by ten times or more. To meet this requirement, it is preferable to form the main insulating layer 21 by using $SiO_2$ and the stopper layer 15 and the auxiliary insulating layer 22 by using $Al_2O_3$ and/or $Si_3N_4$.

Subsequently, as illustrated in FIG. 9, a resist layer 31 is formed on the auxiliary insulating layer 22.

By exposure, a predetermined gap 31a is pattern-formed in the resist layer 31. After the gap 31a is subjected to the exposure, post baking is carried out to form slant surfaces 31b and 31b on both end surfaces in the gap 31a, an interval therebetween gradually increasing away from the lower core layer 10.

Figure 10:
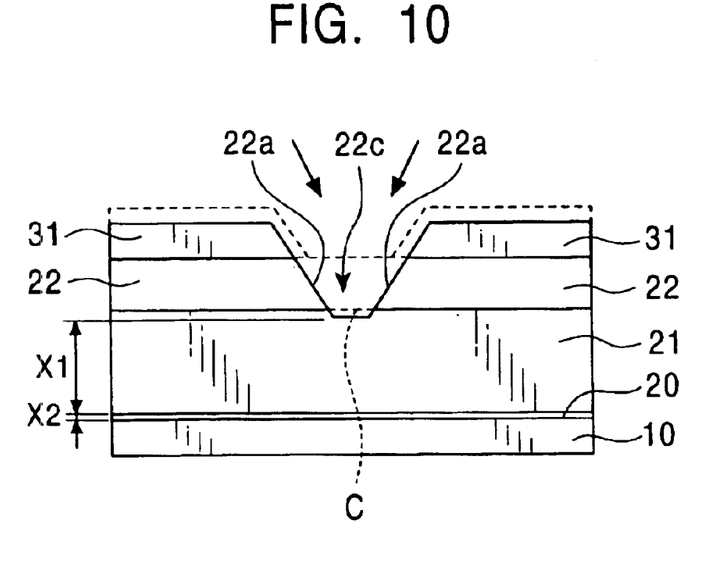
FIG. 10 shows the formation of a groove in the auxiliary insulation layer of a thin-film magnetic head as shown in FIG. 3.

Next, in a step shown in FIG. 10, the auxiliary insulating layer 22 exposed in the gap 31a formed in the resist layer 31 is cut aslant by ion milling so as to form a groove 22c in the auxiliary insulating layer 22. Slant surfaces 22a and 22a that continue from the slant surfaces 31b and 31b of the resist layer 31 are formed on both end surfaces of the groove 22c.

By the ion milling, the groove 22c of the auxiliary insulating layer 22 is formed to reach the main insulating layer 21. Hence, the main insulating layer 21 is exposed in the groove 22c, and the exposed main insulating layer 21 is slightly cut off by the ion milling (a portion denoted by C shown in FIG. 10).

Figure 11:
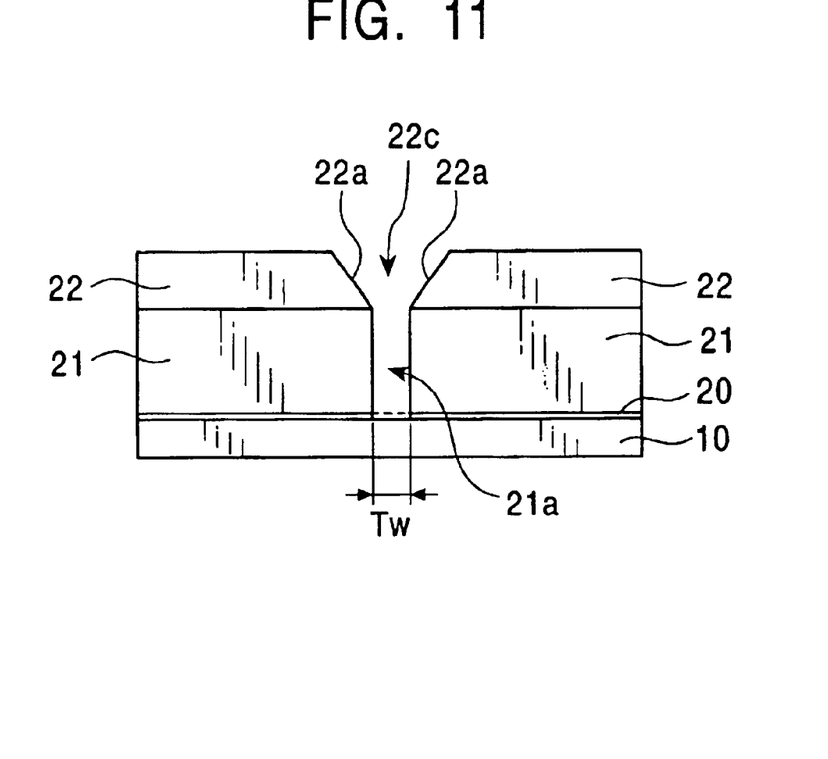
FIG. 11 shows the removal of a resist layer in a thin-film magnetic head as shown in FIG. 3.
Figure 12:
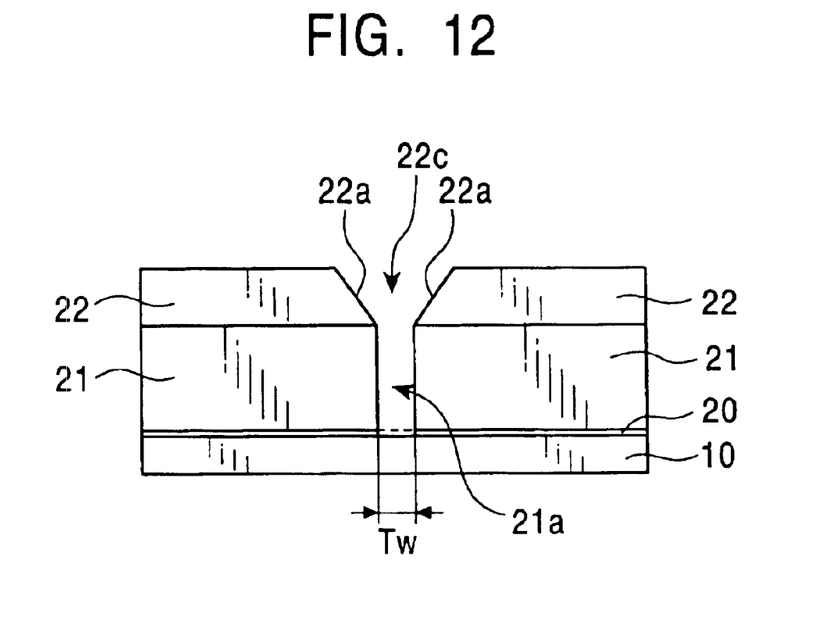
FIG. 12 shows the formation of a groove in the main insulating layer of a thin-film magnetic head as shown in FIG. 3.

In FIGS. 11 and 12 the resist layer 31 is removed. Furthermore, a portion of the main insulating layer 21 exposed in the groove 22c formed in the auxiliary insulating layer 22 is cut by the reactive ion etching (RIE) thereby to form the track width restricting groove 21a in the main insulating layer 21.

As mentioned above, the etching rate for the reactive ion etching of the auxiliary insulating layer 22 is set to be lower than the etching rate of the main insulating layer 21.

Therefore, even when the resist layer 31 shown in FIG. 10 is removed the auxiliary insulating layer 22 functions as a mask. The main insulating layer 21 is mainly cut by the reactive ion etching, permitting the track width restricting groove 21a of a predetermined configuration to be formed in the main insulating layer 21. According to the invention, if a width T1 of the gap 31a provided in the resist layer 31 shown in FIG. 9 is substantially equal to a limit value of resolution in exposure, then the slant surfaces 22a and 22a are formed on the auxiliary insulating layer 22 so that an interval therebetween gradually becomes smaller than the width T1 toward the lower core layer 10. Accordingly, the width of the main insulating layer 21 exposed in the groove 22c formed in the auxiliary insulating layer 22 is set to a value smaller than the width T1, that is, smaller than a resolution used for the exposure of the resist.

Thus, in the present invention, the track width restricting groove 21a can be formed in the main insulating layer 21 and in a width smaller than the resolution of the exposure of the resist. This makes it possible to fabricate a thin film magnetic head that permits a further narrower track in the future.

Preferably, over-etching is performed during the reactive ion etching carried out for forming the track width restricting groove 21a in the main insulating layer 21. The over-etching makes it possible to form the track width restricting groove 21a that fully penetrates the main insulating layer 21, leaving no portion of the main insulating layer 21 in the groove 21a. This in turn enables the stopper layer 20 to be exposed at the bottom of the track width restricting groove 21a as illustrated in FIG. 11.

A thickness of a film of the main insulating layer 21 formed on the stopper layer 20, which film is to be removed by the reactive ion etching, is denoted as X1. A ratio of an etching rate of the main insulating layer 21 to an etching rate of the stopper layer 20 is set to Y:1. An over-etching amount for the film thickness X1 of the main insulating layer 21 is denoted as N%. It is preferable to set a film thickness X2 of the stopper layer to $X2 \geq (X1 \cdot N)/(Y \cdot 100)$. The over-etching amount is determined as follows. When it is assumed that the same material as that used for the main insulating layer 21 is over-etched, exceeding the film thickness X1, an amount of the material etched, exceeding the film thickness X1, indicates the over-etching amount, which is expressed by $X1 \cdot N/100$. With this arrangement, even when over-etching is implemented, the stopper layer 20 will remain between the bottom surface of the track width restricting groove 21a formed in the main insulating layer 21 and the surface of the lower core layer 10.

Then, according to the invention, the stopper layer 20 left on the lower core layer 10 in the track width restricting groove 21a is removed by the reactive ion etching.

As set forth above, the stopper layer 20 is composed of an insulating material having a small etching rate for the reactive ion etching rate, and formed to have a thin film that allows the stopper layer 20 to remain on the lower core layer 10 when the main insulating layer 21 is over-etched. With this arrangement, easier etching control can be conducted. The stopper layer 20 provided under the track width restricting groove 21a can be fully and easily removed.

The track width restricting groove 21a formed as described above fully reaches the surface of the lower core layer 10, leaving no portion of the main insulating layer 21 or the stopper layer 20 in the track width restricting groove 21a.

Furthermore, in the present invention, the lower magnetic pole layer 12 magnetically connected to the lower core layer 10 shown in FIG. 3 is formed by plating in the track width restricting groove 21a.

The main insulating layer 21 and the stopper layer 20 in the track width restricting groove 21a are completely removed and none of the layers are left therein as described above. This allows the lower magnetic pole layer 12 to be ideally grown by plating on the lower core layer 10, permitting reliable magnetic connection between the lower core layer 10 and the lower magnetic pole layer 12.

Then, the gap layer 13 and the upper magnetic pole layer 14 are formed in succession by plating on the lower magnetic pole layer 12. The upper core layer 16 is formed by plating so that it extends from a top of the upper magnetic pole layer 14 to the slant surfaces 22a and 22a formed on the auxiliary insulating layer 22. This completes the fabrication of the thin film magnetic head.

In the invention, the gap layer 13 may be directly formed by plating on the lower core layer 10 in the groove 21a. The upper core layer 16 may be directly formed by plating on the gap layer 13.

Thus, according to the present invention described in detail above, the stopper layer having an etching rate that is smaller than the reactive ion etching rate of the insulating layer is interposed between the lower core layer and the insulating layer thereby to enable a track width restricting groove to be formed that fully penetrates the insulating layer from its top to bottom. Preferably, over-etching is performed in the step for forming the groove.

The stopper layer is formed of an insulating material having a lower etching rate and formed to have a thin film that allows the stopper layer to remain on the lower core layer when the insulating layer is over-etched. With this arrangement, in removing a portion of the stopper layer that is left at the bottom of the track width restricting groove of the insulating layer, easier etching control can be conducted, and the stopper layer can be completely removed.

As set forth above, the track width restricting groove that completely reaches down to the surface of the lower core layer and that is completely free of any portion of an insulating layer or the stopper layer is formed. This allows a magnetic pole layer or the like to be properly grown by plating in the groove, thus permitting fabrication of a thin film magnetic head having good recording characteristics to be achieved.

What is claimed is:

1. A thin film magnetic head comprising:
   a lower core layer; an upper core layer; at least one insulating layer positioned between the lower core layer and the upper core layer; a track width restricting groove being formed in the insulating layer; and a lower magnetic pole layer and an upper magnetic pole layer, the lower magnetic pole layer continuing from the lower core layer, the upper magnetic pole layer continuing from the upper core layer, and a gap layer positioned between one of the core layers and one of the magnetic pole layers that opposes the core layer or between the two magnetic pole layers being provided in the track width restricting groove,
   wherein a stopper layer is placed, in a portion excluding the track width restricting groove, between the lower core layer and the insulating layer, and the stopper layer is formed of an insulating material having an etching rate lower than a reactive ion etching rate of the insulating layer.

2. A thin film magnetic head according to claim 1, wherein the stopper layer is formed to have a film thickness that is smaller than the insulating layer.

3. A thin film magnetic head according to claim 1, wherein an etching rate of the stopper layer in reactive ion etching is less than the etching rate of the insulating layer by ten times or more.

4. A thin film magnetic head according to claim 3, wherein the insulating layer is formed of $SiO_2$ and the stopper layer is formed of at least one of $Al_2O_3$ and $Si_3N_4$.

5. A thin film magnetic head comprising:

a lower core layer; an upper core layer; at least one insulating layer positioned between the lower core layer and the upper core layer; a track width restricting groove being formed in the insulating layer and having at least one slant surface disposed between the upper core layer and the insulating layer; and a lower magnetic pole layer and an upper magnetic pole layer, the lower magnetic pole layer continuing from the lower core layer, the upper magnetic pole layer continuing from the upper core layer, and a gap layer positioned between one of the core layers and one of the magnetic pole layers that opposes the core layer or between the two magnetic pole layers being provided in the track width restricting groove, wherein a stopper layer is placed, in a portion excluding the track width restricting groove, between the lower core layer and the insulating layer, and the stopper layer is formed of an insulating material having an etching rate lower than a reactive ion etching rate of the insulating layer, and wherein the gap layer and the upper magnetic pole layer are disposed in a portion of the insulating layer excluding the slant surface.

* * * * *